(12) United States Patent
Kwon et al.

(10) Patent No.: US 12,296,889 B2
(45) Date of Patent: May 13, 2025

(54) BATTERY REAR UNDERCOVER ASSEMBLY FOR AN ECO-FRIENDLY VEHICLE

(71) Applicants: HYUNDAI MOTOR COMPANY, Seoul (KR); KIA CORPORATION, Seoul (KR)

(72) Inventors: Kang-Hyuck Kwon, Suwon-si (KR); Byung-Ok Lee, Yongin-si (KR); Seung-Tae Song, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 678 days.

(21) Appl. No.: 17/569,334

(22) Filed: Jan. 5, 2022

(65) Prior Publication Data

US 2023/0009517 A1  Jan. 12, 2023

(30) Foreign Application Priority Data

Jul. 9, 2021  (KR) .......................... 10-2021-0090379

(51) Int. Cl.
  *H01M 50/242*  (2021.01)
  *B62D 21/15*  (2006.01)
  *H01M 50/249*  (2021.01)

(52) U.S. Cl.
  CPC ........ *B62D 21/155* (2013.01); *H01M 50/242* (2021.01); *H01M 50/249* (2021.01); *H01M 2220/20* (2013.01)

(58) Field of Classification Search
  CPC .............. B62D 21/155; H01M 50/242; H01M 2220/20; H01M 50/249; B60K 1/04
  See application file for complete search history.

(56) References Cited

U.S. PATENT DOCUMENTS

| 10,442,390 B2 | 10/2019 | Shen et al. | |
| 10,814,710 B2* | 10/2020 | Nagano | B60K 1/04 |
| 2010/0307848 A1* | 12/2010 | Hashimoto | B60K 1/04 |
| | | | 180/68.5 |
| 2013/0026797 A1 | 1/2013 | Onodera et al. | |
| 2013/0059187 A1* | 3/2013 | Kang | H01M 50/227 |
| | | | 429/100 |

(Continued)

FOREIGN PATENT DOCUMENTS

| JP | 2012066764 A | 4/2012 |
| JP | 2019069755 A | 5/2019 |

(Continued)

*Primary Examiner* — Jason D Shanske
*Assistant Examiner* — James J Triggs
(74) *Attorney, Agent, or Firm* — Lempia Summerfield Katz LLC

(57) ABSTRACT

A battery rear undercover assembly for an eco-friendly vehicle enables the bottom of a vehicle to be flattened while covering a lower portion of the rear of a high-voltage battery in an eco-friendly vehicle. The battery rear undercover assembly includes a body having a front end that can be fastened to a lower portion of a rear end of a high-voltage battery and a battery rear undercover formed to extend from each of both side ends of the body upward and formed with a side cover that can be fastened to a vehicle body of a vehicle. The battery rear undercover assembly includes a reinforcement member formed in a longitudinal direction of the vehicle and fastened to an upper surface of the battery rear undercover.

19 Claims, 12 Drawing Sheets

(56) References Cited

U.S. PATENT DOCUMENTS

2018/0290531 A1* 10/2018 Ajisaka .................. B60L 50/64
2019/0061678 A1    2/2019 Shen et al.
2021/0328205 A1* 10/2021 Tier ..................... H01M 50/20

FOREIGN PATENT DOCUMENTS

| JP | 2021046088 A | 3/2021 |
| JP | 2021062714 A | 4/2021 |
| KR | 20130063415 A | 6/2013 |
| KR | 20170069557 A | 6/2017 |
| KR | 20190059687 A | 5/2019 |

* cited by examiner

PRIORT ART

PRIORT ART

BATTERY REAR UNDERCOVER ASSEMBLY FOR AN ECO-FRIENDLY VEHICLE

CROSS-REFERENCE TO RELATED APPLICATION

This application claims priority to Korean Patent Application No. 10-2021-0090379, filed on Jul. 9, 2021, which is incorporated herein by reference in its entirety.

BACKGROUND

Field of the Disclosure

The present disclosure relates to a battery rear undercover assembly for an eco-friendly vehicle, which enables a bottom of a vehicle to be flattened while covering a rear lower portion of a high-voltage battery in an eco-friendly vehicle.

Description of Related Art

An undercover configured to protect the bottom of a vehicle is mounted on a lower portion of the vehicle.

Generally, an undercover 113 is fastened only to components of a vehicle body 111 side in a vehicle driven by an internal combustion engine, as shown in FIGS. 1 and 2. In particular, the undercover 113 is located only on a front of a region shown by line B-B of FIG. 2.

Recently, eco-friendly vehicles, such as an electric vehicle, a hybrid vehicle, and a hydrogen vehicle, driven by using power charged in a high-voltage battery are being actively supplied (i.e., manufactured, used).

In such eco-friendly vehicles, the capacity of the high-voltage battery is expanding to increase a traveling distance using the high-voltage battery. To secure a space for mounting the high-voltage battery, a space under a seat of the vehicle is mainly used.

Meanwhile, to protect the high-voltage battery, an undercover is also applied to the eco-friendly vehicle. However, as described above, there is a problem in that it is not possible to flatten the bottom of the vehicle in the structure where the undercover can be mounted only on a portion of the vehicle body.

As described above, when the bottom of the vehicle is not flattened, it is not possible to secure desirable aerodynamic performance. This may result in not increasing the traveling distance, i.e., reducing driving range.

The contents described in the Description of Related Art section are to help understand the background of the present disclosure and may include what is not previously known to those having ordinary skill in the art to which the present disclosure pertains.

SUMMARY

The present disclosure has been made in an effort to solve the above problems associated with the related art. An object of the present disclosure is to provide a battery rear undercover assembly for an eco-friendly vehicle, which may secure (e.g., provide, achieve, maintain) its own stiffness while being mountable to a high-voltage battery in an eco-friendly vehicle, thereby enabling a bottom of the vehicle to be flattened.

A battery rear undercover assembly is provided for an eco-friendly vehicle according to the present disclosure for achieving the objects. The battery undercover assembly may include a body having a front end configured to be fastened to a lower portion of a rear end of a high-voltage battery and may include a battery rear undercover formed to extend from each of both side ends of the body upward and formed with a side cover configured to be fastened to a vehicle body of a vehicle.

The front end of the body may be formed to contact a rear end of a battery cover mounted on a lower portion of the high-voltage battery.

The front end of the body may be formed to be inclined toward the rear of the vehicle for a predetermined length from both ends toward the center thereof, and to have an intermediate portion formed in a width direction of the vehicle.

The side cover may be formed with a front fastening part extending from the side cover to a side surface of the vehicle and fastened to a vehicle body and with a rear fastening part extending from the side cover to the side surface of the vehicle, located on the rear of the front fastening part, and fastened to the vehicle body.

A vehicle body fastening hole through which a fastening member penetrates may be formed in the front fastening part and the rear fastening part, respectively, to fix the side cover to the vehicle body.

The rear fastening part may be located above the front fastening part.

A longitudinal bead may be formed to be convex or concave from the body and may be formed in a longitudinal direction of the vehicle.

A transversal bead may be formed to be convex or concave from the body and may be formed in the width direction of the vehicle.

The longitudinal bead and the transversal bead may be formed to be convex or concave from the body.

The battery rear undercover may be made of a polyethylene terephthalate (PET) material.

The rear end of the body may be located to be spaced apart from a rear suspension undercover of the vehicle at a predetermined distance.

The battery rear undercover assembly may further include a reinforcement member formed in the longitudinal direction of the vehicle and fastened to an upper surface of the battery rear undercover.

The reinforcement member may include a front portion fastened to the high-voltage battery together with the battery rear undercover, a rear portion fastened to the battery rear undercover, and a neck portion located between the front portion and the rear portion.

The front portion may have a cross section being flat on an intermediate portion thereof and bent downward on both side ends thereof.

The rear portion may have a cross section being flat on an intermediate portion thereof and convex on both side ends thereof.

The neck portion may be formed to be convex above the front portion.

The front portion may be formed with a battery fastening hole through which a fastening member that fastens the reinforcement member to the vehicle body together with the battery rear undercover penetrates.

The rear portion may be formed with a cover fastening hole through which a fastening member that fastens the reinforcement member to the battery rear undercover penetrates.

The rear end of the high-voltage battery may be fastened to a bracket and the battery rear undercover and the reinforcement member may be fastened to the bracket together.

The reinforcement member may be made of a PP-GF30 material that is a mixed material of the polypropylene and the glass fiber.

According to the battery rear undercover assembly for the eco-friendly vehicle according to the present disclosure having the above configuration, the entire section of the bottom of the vehicle may be flattened in the eco-friendly vehicle to which the high-voltage battery is applied This reduces the resistance of the air flowing between the bottom of the vehicle and the road surface to increase the traveling distance at which the vehicle can travel using the high-voltage battery.

Further, it is possible to form the battery rear undercover and the reinforcement member made of the synthetic resin, and to optimize the cross-sectional structure of the reinforcement member, thereby minimizing the increase in the weight of the vehicle to increase the traveling distance.

DESCRIPTION OF SPECIFIC EMBODIMENTS

Figure 1:
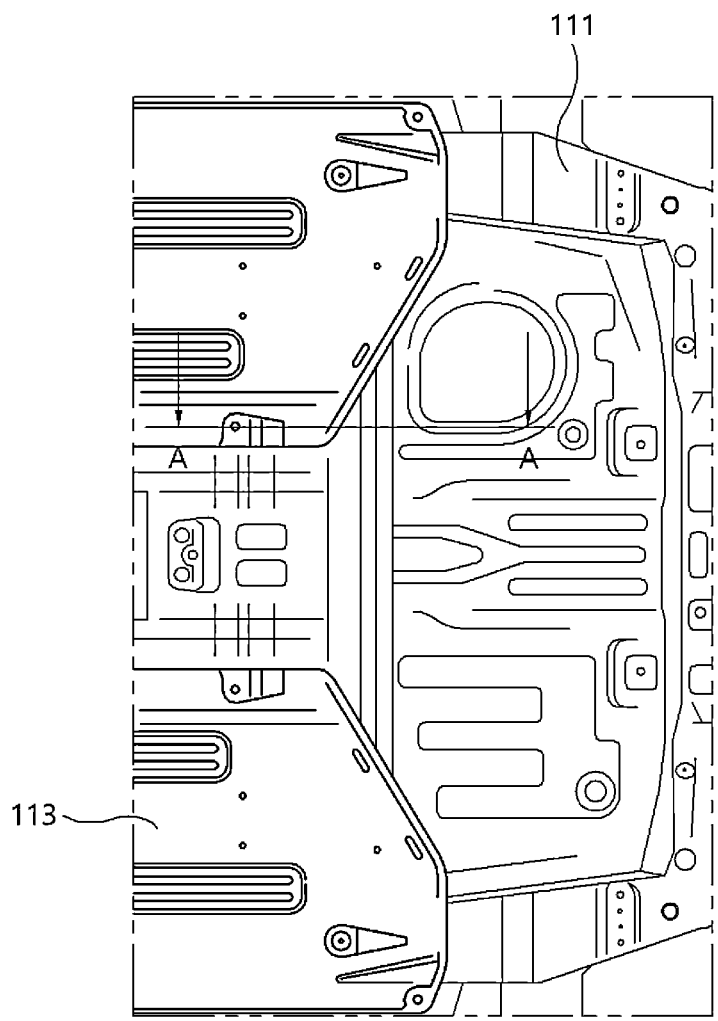
FIG. 1 is a bottom diagram showing a part of the bottom of a vehicle according to the related art.
Figure 2:
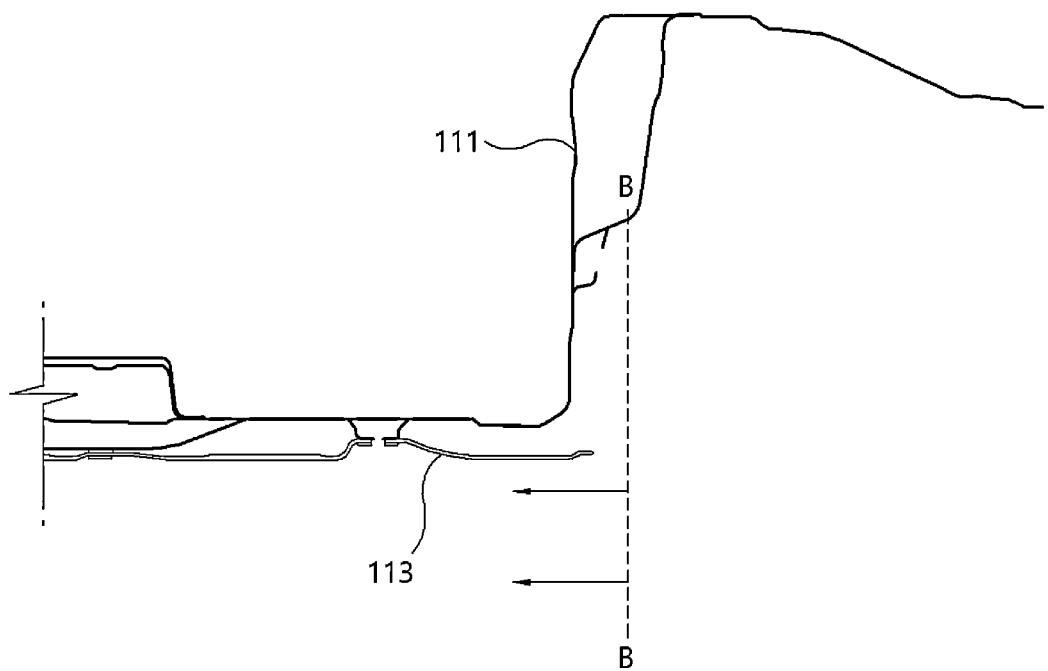
FIG. 2 is a cross-sectional diagram taken along section A-A of FIG. 1.
Figure 3:
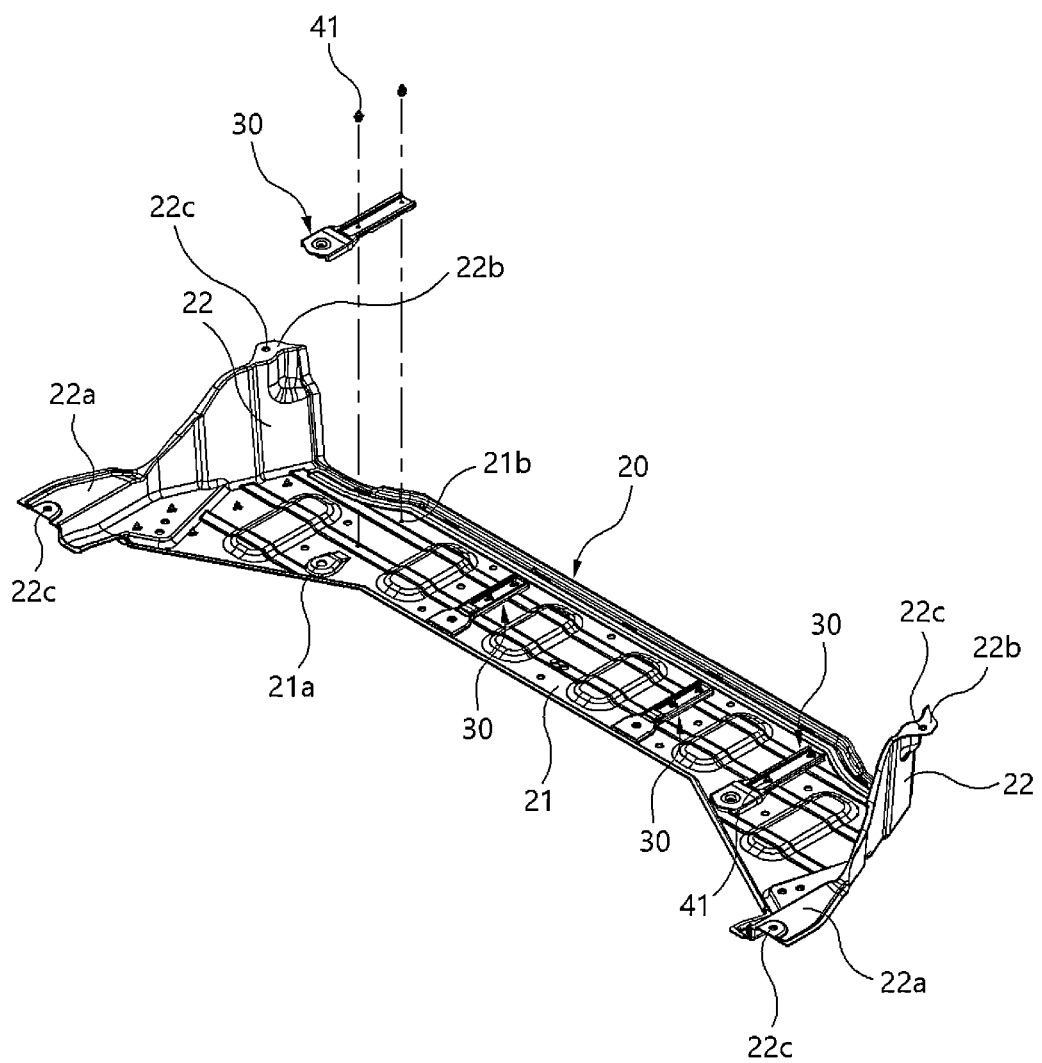
FIG. 3 is a perspective diagram of a battery rear undercover assembly for an eco-friendly vehicle according to the present disclosure.
Figure 4:
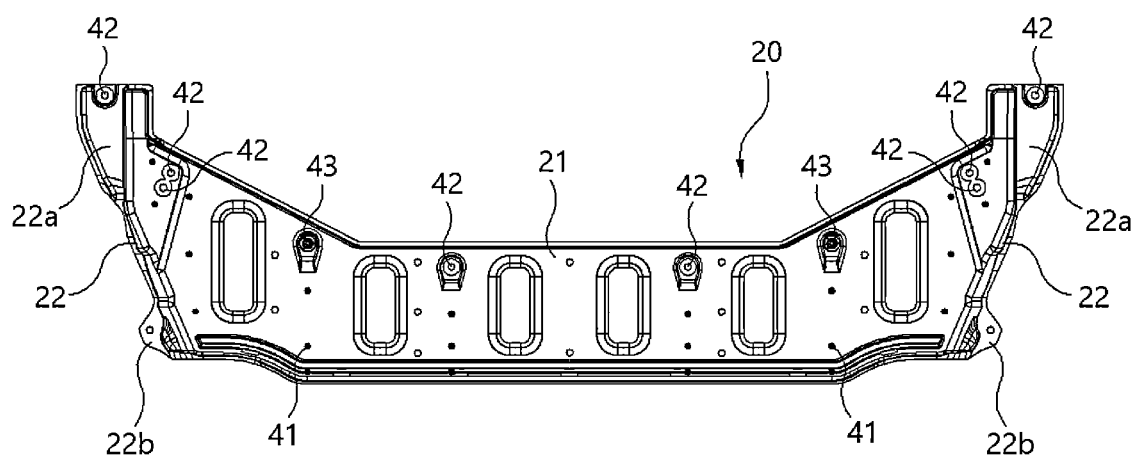
FIG. 4 is a bottom diagram of the battery rear undercover assembly for the eco-friendly vehicle according to the present disclosure.

Hereinafter, a battery rear undercover assembly for an eco-friendly vehicle according to the present disclosure is described in detail with reference to the accompanying drawings. When a component, device, element, or the like of the present disclosure is described as having a purpose or performing an operation, function, or the like, the component, device, or element should be considered herein as being "configured to" meet that purpose or perform that operation or function.

A battery rear undercover assembly for an eco-friendly vehicle according to the present disclosure, as shown in FIGS. 3-8, may include a body 21 having a front end fastened to a lower portion of a rear end of a high-voltage battery 11 and may include a battery rear undercover 20 formed to extend from each of both side ends of the body 21 upward. The battery rear undercover 20 may be formed with a side cover 22 at each side or end and fastened to a vehicle body of a vehicle, and may include a reinforcement member 30 formed in a longitudinal direction of the vehicle, and fastened to an upper surface of the battery rear undercover 20.

The battery rear undercover 20 may be formed with the body 21 and the side covers 22.

The body 21 may be formed, i.e. arranged, in a width direction of the vehicle. The body 21 may be formed such that a width-directional length or dimension (width) of the vehicle is greater than a longitudinal length of the body 21.

The body 21 may have a structure of having a front end fastened to the high-voltage battery 11 side, and a rear end that is not fixed. Therefore, when viewing a cross section of the body 21, the body 21 may have a cantilever form in which only the front end is fastened to the high-voltage battery 11 to become a fixed end, and the rear end becomes a free end.

Figure 16:
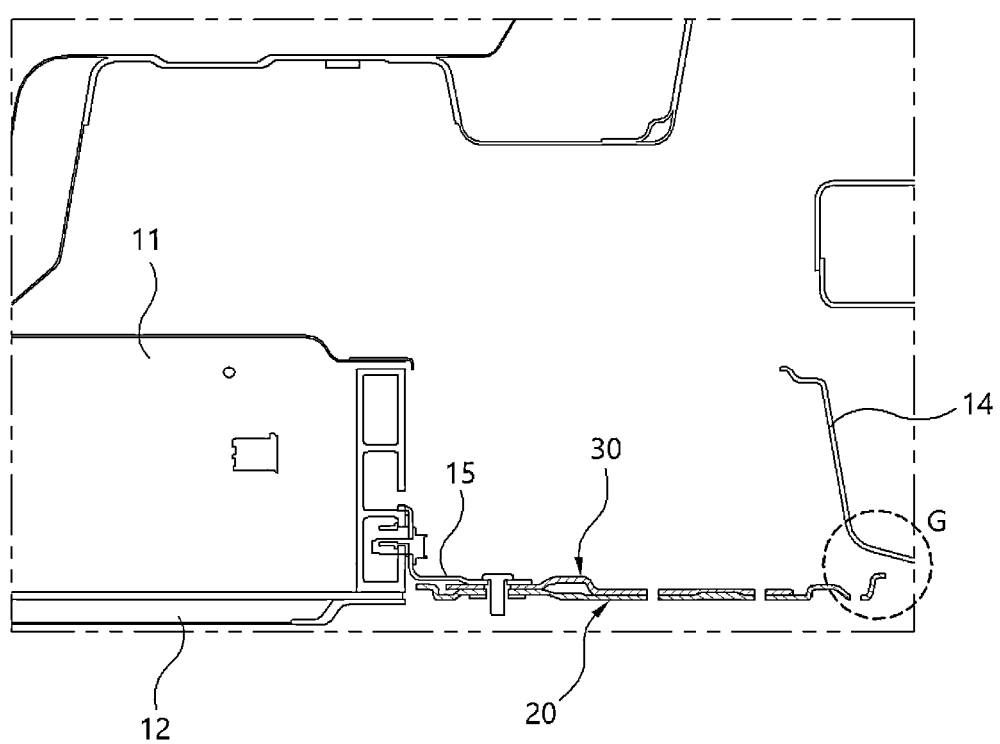
FIG. 16 is a cross-sectional diagram taken along line F-F of FIG. 15.

Here, the reason why the rear end of the body 21 is not fixed may be that a rear suspension undercover 13 disposed under an undercover 14 is not easily fastened to the rear end of the body 21 due to the movement of a chassis. Therefore, the rear end of the body 21 may be located to be spaced apart from the rear suspension undercover 13 at a predetermined distance (see 'G' of FIG. 16).

Meanwhile, the stiffness of the battery rear undercover 20 reduced by not fastening the rear end of the body 21 may be reinforced by the reinforcement member 30 described below.

The front end of the body 21 may have both ends (i.e., both side ends) and a portion adjacent thereto formed to be inclined, and an intermediate portion formed in a width direction of a vehicle. In other words, the body 21 may be formed to be inclined toward the rear of the vehicle for a predetermined length from both side ends toward the center thereof. The body 21 may have the intermediate portion formed in the width direction of the vehicle. Depending upon such a shape, the front end of the body 21 may be formed to contact the rear end of a battery cover 12 mounted on the lower portion of the high-voltage battery 11, such that the bottom of the battery rear undercover 20 may be connected to the battery cover 12, thereby enabling the bottom of the vehicle to be flattened.

The body 21 may be formed with a plurality of battery fastening holes 21a for fastening to the high-voltage battery 11, and a plurality of reinforcement member fastening holes 21b for the fastening to the reinforcement member 30. The plurality of reinforcement member fastening holes 21b may be formed in a longitudinal direction of the vehicle at intervals.

The battery fastening holes 21a may be formed to enable a fastening member, such as a bolt for enabling a bracket fastened to the high-voltage battery 11 to be fastened to the battery rear undercover 20, to penetrate therethrough. Further, the reinforcement member fastening hole 21b may be formed to enable a rivet 41 for enabling the battery rear undercover 20 to be fastened to the reinforcement member 30 to penetrate therethrough.

Figure 5:
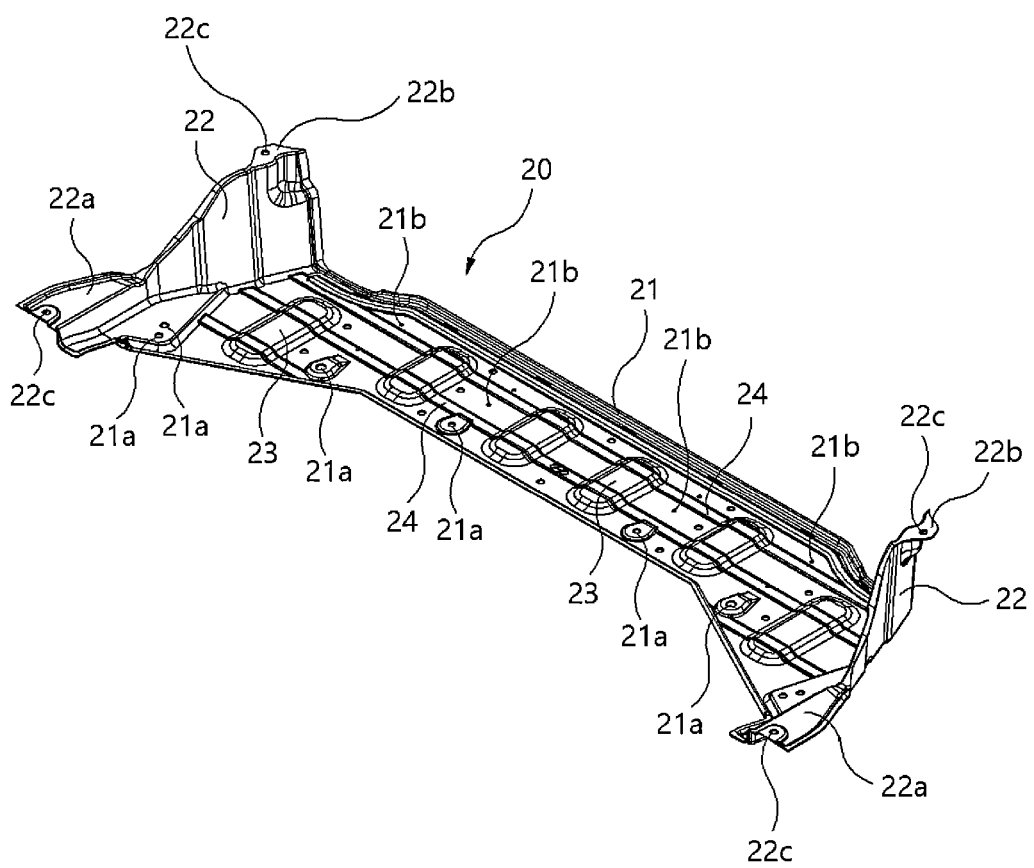
FIG. 5 is a perspective diagram showing a battery rear undercover in the battery rear undercover assembly for the eco-friendly vehicle according to the present disclosure.
Figure 6:
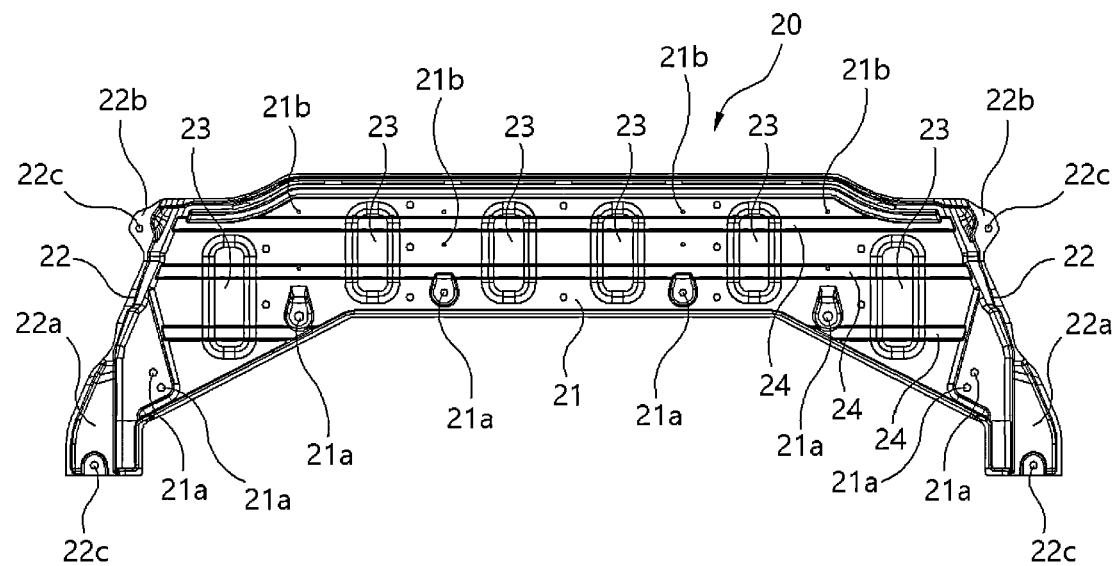
FIG. 6 is a plan diagram showing the battery rear undercover in the battery rear undercover assembly for the eco-friendly vehicle according to the present disclosure.
Figure 7:
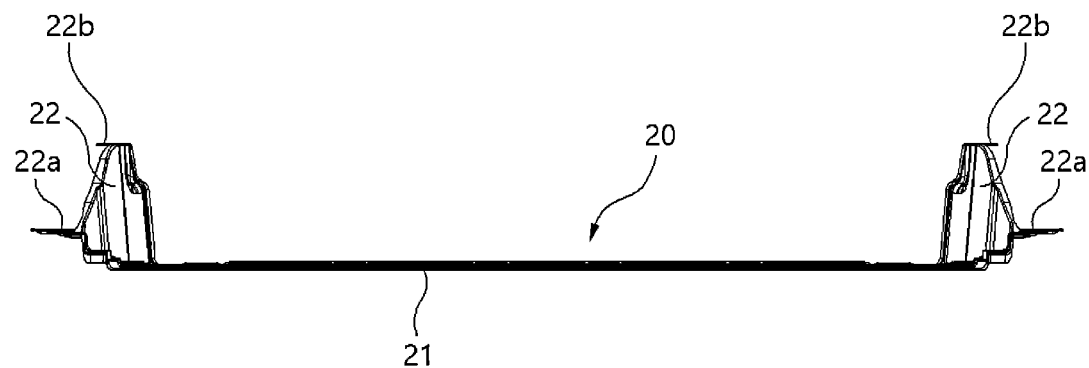
FIG. 7 is a front diagram showing the battery rear undercover in the battery rear undercover assembly for the eco-friendly vehicle according to the present disclosure.
Figure 8:
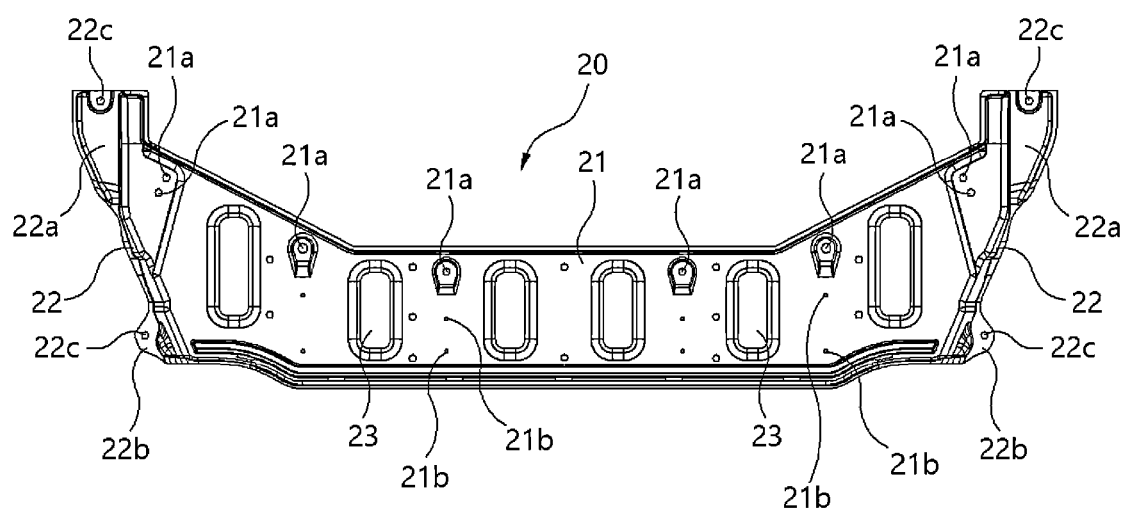
FIG. 8 is a bottom diagram showing the battery rear undercover in the battery rear undercover assembly for the eco-friendly vehicle according to the present disclosure.
Figure 9:
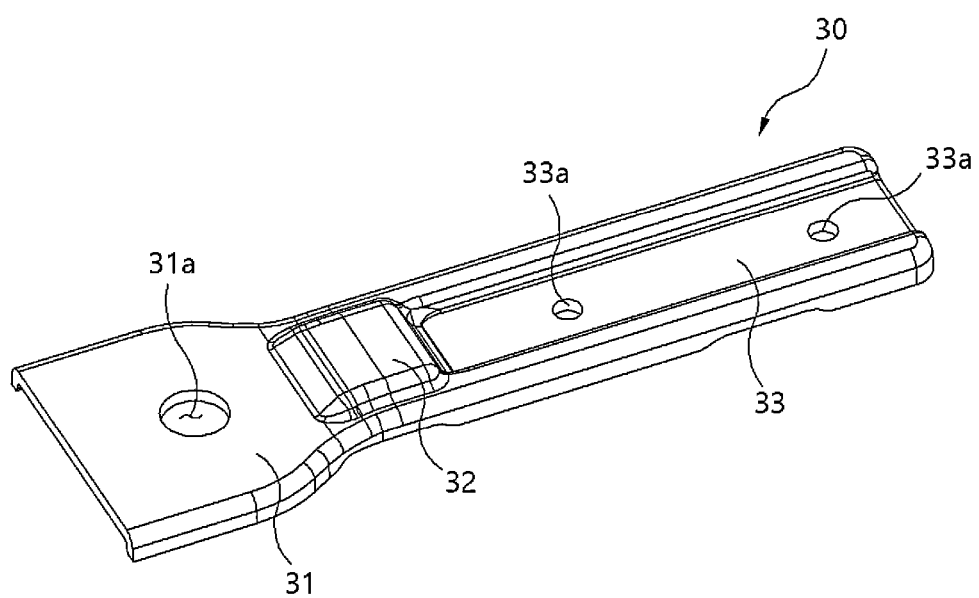
FIG. 9 is a perspective diagram showing a reinforcement member in the battery rear undercover assembly for the eco-friendly vehicle according to the present disclosure.
Figure 10:
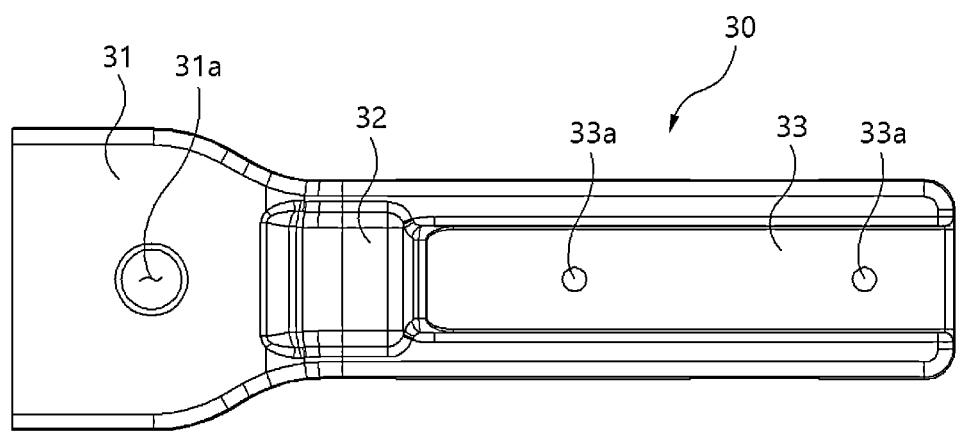
FIG. 10 is a plan diagram showing the reinforcement member in the battery rear undercover assembly for the eco-friendly vehicle according to the present disclosure.
Figure 11:
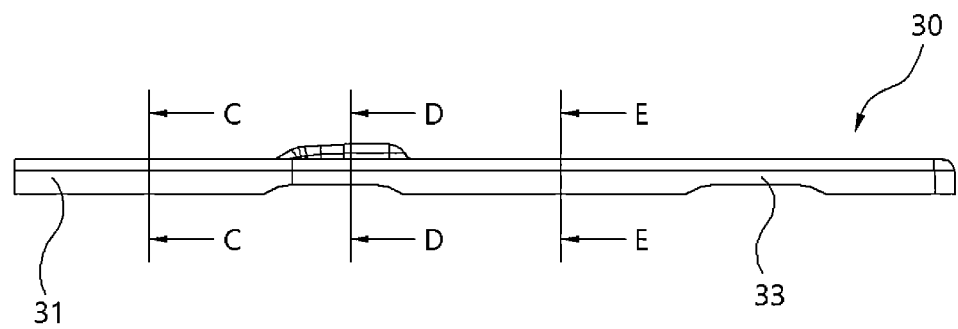
FIG. 11 is a side diagram showing the reinforcement member in the battery rear undercover assembly for the eco-friendly vehicle according to the present disclosure.
Figure 12:
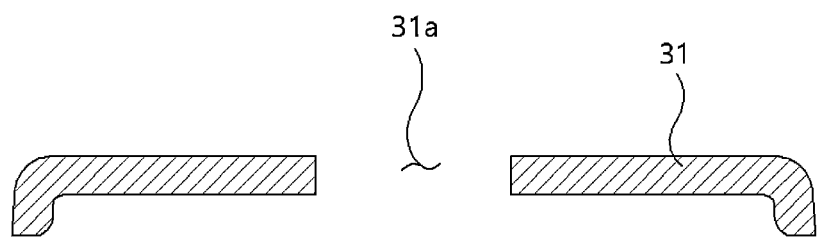
FIG. 12 is a cross-sectional diagram taken along line C-C of FIG. 11.
Figure 13:
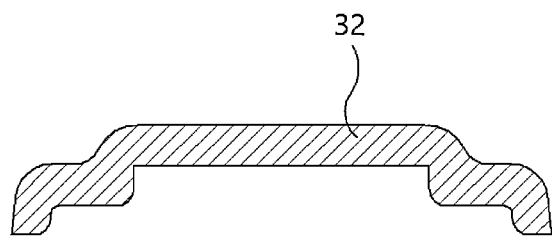
FIG. 13 is a cross-sectional diagram taken along line D-D of FIG. 11.
Figure 14:
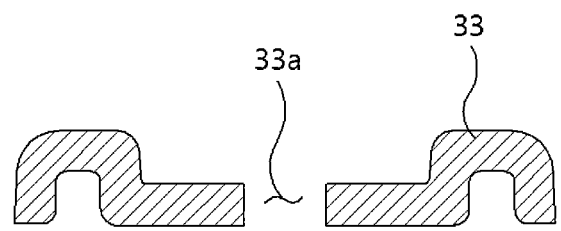
FIG. 14 is a cross-sectional diagram taken along line E-E of FIG. 11.

The body 21 may be formed with one or more beads, ribs, projections, depressions, or the like being convex or concave in any one direction from a surface of the body 21 to reinforce the stiffness of the body 21. In other words, the body 21 may be formed with one or more longitudinal beads 23 configured to reinforce the longitudinal stiffness of the body 21 and one or more transverse beads 24 configured to reinforce the transversal stiffness of the body 21. The longitudinal bead 23 may be formed to be convex or concave in the longitudinal direction of the vehicle from the surface of the body 21, thereby improving the longitudinal stiffness of the body 21. Further, the transversal bead 24 may be formed to be convex or concave in the transversal direction of the vehicle from the surface of the body 21, thereby improving the transversal stiffness of the body 21. The longitudinal bead 23 and the transversal bead 24 may be alternately formed, thereby improving the longitudinal and transversal stiffness of the body 21. The longitudinal bead 23 and the transversal bead 24 may also be formed on the same surface of the body 21 and may also be formed on different surfaces of the body 21. FIG. 5 shows an example in which the longitudinal bead 23 and the transversal bead 24 are formed to protrude to the upper surface of the body 21.

The side covers 22 may each be formed to extend from each of both side ends of the body 21 upward. The side cover 22 may have an upper end fastened to the vehicle body.

The side covers 22 may extend from each of both side ends of the body 21 upward. The side cover 22 may have an upper end fastened to the vehicle body such that the body 21 is located to be spaced apart from the vehicle body.

The bottom of the body 21 may be formed to have substantially the same height, relative to the vehicle height, as that of the bottom of the battery cover 12 to enable the bottom of the eco-friendly vehicle, such as an electric vehicle, a hybrid vehicle, or a hydrogen vehicle, to be flat, thereby reducing the air resistance when traveling.

The side covers 22 may each have a front fastening part 22a formed on an upper end thereof and a rear fastening part 22b located on the rear of the front fastening part 22a to fasten the battery rear undercover 20 to the vehicle body. The front fastening part 22a and the rear fastening part 22b may be formed to extend from the upper end of the respective side cover 22 to the side surface of the vehicle to be flat surfaces in the width direction of the vehicle from the upper end of the side cover 22.

Each of the front fastening part 22a and the rear fastening part 22b may be formed with a vehicle body fastening hole 22c through which a fastening member configured to fasten the battery rear undercover 20 to the vehicle body penetrates.

Figure 15:
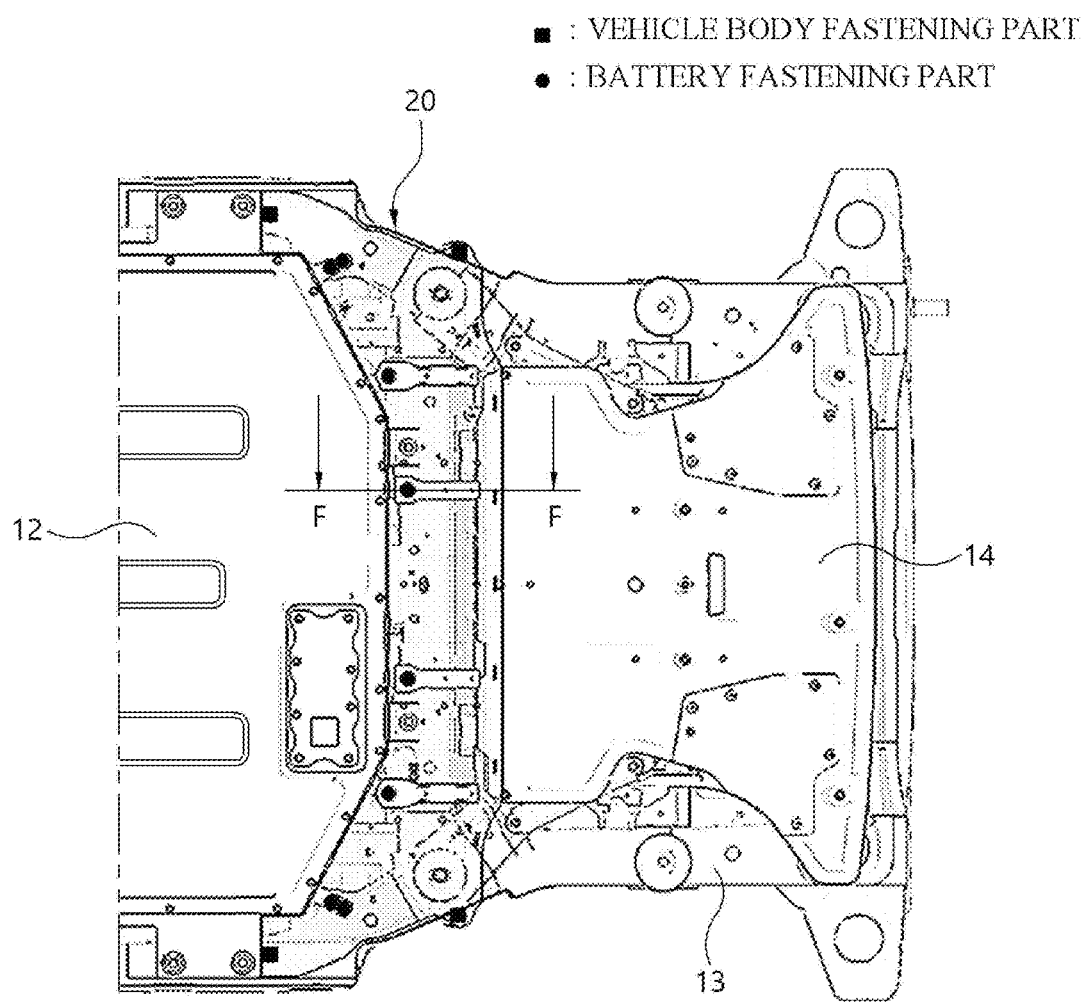
FIG. 15 is a bottom diagram of a vehicle to which the battery rear undercover assembly for the eco-friendly vehicle according to the present disclosure is applied.

The battery rear undercover 20 may be fastened to a rear end of the high-voltage battery 11 or to a bracket 15 fastened to the rear end of the high-voltage battery 11 through the battery fastening hole 21a formed in the body 21, and not directly fastened to the vehicle body. However, the battery rear undercover 20 may be fastened to the vehicle body through the vehicle body fastening hole 22c formed in the side cover 22 (see FIG. 15).

The front fastening part 22a and the rear fastening part 22b may be formed at locations corresponding to portions fastened to the vehicle body, respectively, and the rear fastening part 22b may be formed at a higher location than that of the front fastening part 22a.

In the battery rear undercover 20, most battery fastening holes 21a formed in the body 21 and the vehicle body fastening holes 22c formed in the front fastening part 22a may be provided with nonwoven fabric washers 42 interposed between the battery rear undercover 20 and the fastening member when the fastening member penetrates and is fastened to the battery fastening holes 21a and the vehicle body fastening holes 22c.

Further, when the battery rear undercover 20 is assembled, a preliminary latching clip 43 configured to preliminarily latch the battery rear undercover 20 to the vehicle may be fastened to some of the battery fastening holes 21a formed in the body 21. In a state of preliminarily latching the battery rear undercover 20 to the high-voltage battery 11 using the preliminary latching clip 43, the fastening member may penetrate and may be fastened to the remaining battery fastening holes 21a and the vehicle body fastening holes 22c, thereby completing the assembling.

The battery rear undercover 20 may be made of a synthetic resin material to minimize the weight increase of the vehicle. In particular, the battery rear undercover 20 may be made of a polyethylene terephthalate (PET) material.

The reinforcement member 30 may be fastened to the upper surface of the battery rear undercover 20 to reinforce the longitudinal stiffness of the battery rear undercover 20, thereby preventing the battery rear undercover 20 from sagging. In the battery rear undercover 20, the front end of the body 21 may be fastened to the bracket 15 fastened to the high-voltage battery 11, but the rear end thereof may be not fastened to the vehicle body side, and therefore, sagging may occur and the stiffness may be inevitably weak. Therefore, the reinforcement member 30 formed in the longitudinal direction of the vehicle may be fastened to the upper surface of the battery rear undercover 20 to prevent the rear end of the battery rear undercover 20 from sagging and to reinforce the longitudinal stiffness of the battery rear undercover 20.

The reinforcement member 30 may include a front portion 31 fastened to the high-voltage battery 11 side together with the battery rear undercover 20, a rear portion 33 fastened to only the battery rear undercover 20, and a neck portion 32 located between the front portion 31 and the rear portion 33.

The front portion 31 may be fastened to the high-voltage battery 11 side together with the battery rear undercover 20. The front portion 31 may be fastened to the high-voltage battery side, and therefore, the remaining portions of the reinforcement member 30, that is, the neck portion 32 and the rear portion 33 may support the body 21.

The front portion 31 may also be directly fastened to the rear end of the high-voltage battery 11 together with the battery rear undercover 20. The bracket 15 may be fastened to the rear end of the high-voltage battery 11 and the front portion 31 maybe fastened to the bracket 15 (see FIG. 16).

The front portion 31 may be formed to have a flat intermediate portion, and both ends in the width direction of the vehicle formed in a downwardly bent form, thereby enhancing stiffness when the front portion 31 is be fastened to the high-voltage battery 11 side. The front portion 31 may be formed with a battery fastening hole 31a configured to fasten the reinforcement member 30 to the high-voltage battery 11 side.

The rear portion 33 may be fastened to the battery rear undercover 20, i.e., the body 21. The rear portion 33 may have both side ends in the width direction of the vehicle formed in a convex shape, compared to the flat intermediate portion, to support the battery rear undercover 20 in a state of being not sagging when the reinforcement member 30 is fastened to the battery rear undercover 20. The rear portion 33 may be formed with a cover fastening hole 33a through which the rivet 41 used for fastening the reinforcement member 30 to the battery rear undercover 20 penetrates and is fastened thereto. A plurality of cover fastening holes 33a may be formed in the longitudinal direction of the vehicle at intervals.

The rear portion 33 may be formed to be longer than the front portion 31 and may extend up to and may be fastened to a portion adjacent to the rear end of the body 21, thereby preventing the rear end of the body 21 from being sagged.

The neck portion 32 may be located between the front portion 31 and the rear portion 33. The neck portion 32 may be formed to be convex above the front portion 31 to secure (i.e., increase) the stiffness of the reinforcement member 30 between the front portion 31 and the rear portion 33.

The reinforcement member 30 may be made of a synthetic resin material to minimize the weight increase of the vehicle. The reinforcement member 30 may be made of a PP-GF30 material that is a mixed material of the polypropylene and the glass fiber. The reinforcement member 30 may be made of the PP-GF30, thereby securing the maximum stiffness in the same weight.

What is claimed is:

1. A battery rear undercover assembly for an eco-friendly vehicle, the battery rear undercover assembly comprising:
a body having a front end configured to be fastened to a lower portion of a rear end of a high-voltage battery; and
a battery rear undercover formed to extend from each of a pair of side ends of the body upward and formed with a pair of side covers configured to be fastened to a vehicle body of a vehicle,
wherein the front end of the body is formed to be inclined toward a rear of the vehicle for a predetermined length from both ends toward a center thereof, and has an intermediate portion formed linearly in a width direction of the vehicle, and
wherein the front end of the body is formed to contact a rear end of a battery cover, such that a bottom of the battery rear undercover has the same height as a bottom of the battery cover, thereby enabling the bottom of the vehicle to be flattened to reduce an air resistance when traveling.

2. The battery rear undercover assembly of claim 1, wherein the battery cover is mounted on a lower portion of the high-voltage battery.

3. The battery rear undercover assembly of claim 1, wherein each of the pair of side covers is formed with a front fastening part extending from each of the pair of the side covers to a side surface of the vehicle and configured to be fastened to the vehicle body, and
a rear fastening part extending from each of the pair of the side covers to the side surface of the vehicle, located on a rear of the front fastening part, and configured to be fastened to the vehicle body.

4. The battery rear undercover assembly of claim 3, wherein a vehicle body fastening hole through which a fastening member penetrates is formed in the front fastening part and the rear fastening part, respectively, to fix each of the pair of side covers to the vehicle body.

5. The battery rear undercover assembly of claim 3, wherein the rear fastening part is located above the front fastening part.

6. The battery rear undercover assembly of claim 1, wherein a longitudinal bead is formed to be convex or concave from the body and is formed in a longitudinal direction of the vehicle.

7. The battery rear undercover assembly of claim 6, wherein a transversal bead is formed to be convex or concave from the body and is formed in the width direction of the vehicle.

8. The battery rear undercover assembly of claim 7, wherein the longitudinal bead and the transversal bead are formed to be convex or concave from the body.

9. The battery rear undercover assembly of claim 1, wherein the battery rear undercover is made of a polyethylene terephthalate (PET) material.

10. The battery rear undercover assembly of claim 1, wherein a rear end of the body is located to be spaced apart from a rear suspension undercover of the vehicle at a predetermined distance.

11. The battery rear undercover assembly of claim 1, further comprising: a reinforcement member formed in a longitudinal direction of the vehicle and fastened to an upper surface of the battery rear undercover.

12. The battery rear undercover assembly of claim 11, wherein the reinforcement member comprises:
a front portion configured to be fastened to the high-voltage battery together with the battery rear undercover;
a rear portion fastened to the battery rear undercover; and
a neck portion located between the front portion and the rear portion.

13. The battery rear undercover assembly of claim 12, wherein the front portion has a cross section being flat on an intermediate portion thereof and bent downward on both side ends thereof.

14. The battery rear undercover assembly of claim 12, wherein the rear portion has a cross section being flat on an intermediate portion thereof and convex on both side ends thereof.

15. The battery rear undercover assembly of claim 12, wherein the neck portion is formed to be convex above the front portion.

16. The battery rear undercover assembly of claim 12, wherein the front portion is formed with a battery fastening hole through which a fastening member that fastens the reinforcement member to the vehicle body together with the battery rear undercover penetrates.

17. The battery rear undercover assembly of claim 12, wherein the rear portion is formed with a cover fastening hole through which a fastening member that fastens the reinforcement member to the battery rear undercover penetrate.

18. The battery rear undercover assembly of claim 12, wherein the battery rear undercover and the reinforcement member are configured to be fastened together to a bracket fastened to the high voltage battery.

19. The battery rear undercover assembly of claim 11, wherein the reinforcement member is made of a PP-GF30 material that is a mixed material of a polypropylene and a glass fiber.

* * * * *